United States Patent

Takahata et al.

[11] Patent Number: 5,739,606
[45] Date of Patent: Apr. 14, 1998

[54] SUPERCONDUCTING BEARING DEVICE

[75] Inventors: Ryoichi Takahata, Yamatotakada; Motoaki Shibayama, Takamatsu; Hiroshi Takaichi, Tokyo, all of Japan

[73] Assignees: Koyo Seiko Co., Ltd., Osaka; Shikoku Research Institute Inc., Takamatsu, both of Japan

[21] Appl. No.: 632,612

[22] Filed: Apr. 15, 1996

Related U.S. Application Data

[63] Continuation-in-part of Ser. No. 117,088, Feb. 8, 1994.

[30] Foreign Application Priority Data

Mar. 15, 1991 [JP] Japan ......... 3-51430
Jul. 16, 1991 [JP] Japan ......... 3-175356

[51] Int. Cl.$^6$ ......... H02K 7/09
[52] U.S. Cl. ......... 310/90.5
[58] Field of Search ......... 310/90.5

[56] References Cited

U.S. PATENT DOCUMENTS

| | | | |
|---|---|---|---|
| 3,233,950 | 2/1966 | Baermann | 310/90.5 |
| 3,612,630 | 10/1971 | Rosensweig | 310/90.5 |
| 3,614,181 | 10/1971 | Meeks | 310/90.5 |
| 4,072,370 | 2/1978 | Wasson | 310/90.5 |
| 5,126,317 | 6/1992 | Agarwala | 310/90.5 |
| 5,177,387 | 1/1993 | McMichael | 310/90.5 |
| 5,196,748 | 3/1993 | Rigney | 310/90.5 |
| 5,220,232 | 6/1993 | Rigney, II et al. | 310/90.5 |
| 5,254,528 | 10/1993 | Takahata | 310/90.5 |
| 5,256,638 | 10/1993 | Weinberger et al. | 310/90.5 |
| 5,313,130 | 5/1994 | Shibayama et al. | 310/90.5 |
| 5,314,868 | 5/1994 | Takahata et al. | 310/90.5 |
| 5,330,967 | 7/1994 | Takahata et al. | 310/90.5 |
| 5,438,038 | 8/1995 | Takahata et al. | 310/90.5 |
| 5,446,018 | 8/1995 | Takahata et al. | 310/90.5 |

FOREIGN PATENT DOCUMENTS

| | | |
|---|---|---|
| 467341 | 1/1992 | European Pat. Off. |
| 57-97917 | 6/1982 | Japan ......... 310/90.5 |
| 58-83552 | 5/1983 | Japan . |
| 58-47570 | 10/1983 | Japan . |
| 1-69360 | 5/1989 | Japan . |
| 64-41726 | 5/1989 | Japan . |
| WO 90/03524 | 5/1990 | WIPO . |
| WO 92/10871 | 6/1992 | WIPO . |

OTHER PUBLICATIONS

Patent Abstracts of Japan, vol. 14, No. 81 (Feb. 15, 1990).
M. Marinescu et al., "Passive Axial Stabilization of a Magnetic Radial Bearing by Superconductors," IEEE Transactions on Magnetics vol. 25, No. 5 (Sep. 1989).
J-P. Yonnet et al., "Stacked Structures of Passive Magnetic Bearings," Journal of Applied Physics, vol. 70, No. 10 (Nov. 15, 1991).

*Primary Examiner*—Mark O. Budd
*Attorney, Agent, or Firm*—Reid & Priest L.L.P.

[57] ABSTRACT

A superconducting bearing device comprises an annular permanent magnet portion disposed concentrically with a rotary body in the form of a vertical shaft, and superconductors opposed to the lower end face of the magnet portion and vertically spaced apart therefrom. The permanent magnet portion comprises a disk fixedly mounted on the rotary body, and annular permanent magnets embedded in the disk at a spacing radially of the rotary body. Each of the magnets has upper and lower ends magnetized to polarities opposite to each other, and the adjacent magnets are magnetized to polarities opposite to each other at the upper ends, as well as at the lower ends. The radial spacing between the magnets is optimized in accordance with the radial dimension (width) of the magnets. This improves the device in load capacity and rigidity and prevents the deflection of axis of the rotary body, enabling the bearing device to support the rotary body in a noncontact state with good stability.

6 Claims, 3 Drawing Sheets

SUPERCONDUCTING BEARING DEVICE

CROSS-REFERENCE TO RELATED APPLICATION

The present patent application is a continuation-in-part of application Ser. No. 08/117,088, filed Feb. 8, 1994 now pending, which is incorporated herein by reference in its entirety.

BACKGROUND OF THE INVENTION

1. Field of the Invention

The present invention relates to superconducting bearing devices, for example, for use in hydraulic machines and machine tools which require high-speed rotation, power storage apparatus for storing excessive electric power as converted to kinetic energy of a flywheel, or gyroscopes.

2. Related Art

In recent years, superconducting beating devices capable of supporting a rotary body in a non-contact state have been developed as bearing devices permitting high-speed rotation of the rotary body and having high rigidity.

It is thought that such superconducting beating devices comprise, for example, an annular permanent magnet disposed concentrically with a rotary body and having axially opposite ends magnetized to polarities opposite to each other, and an annular superconductor opposed to the end face of the magnet and spaced apart therefrom axially of the rotary body.

However, the superconducting bearing device has the problem of being insufficient in rigidity with respect to the direction of the rotation axis and in load capacity. Another problem encountered is that the device is unable to support the rotary body in a noncontact state with good stability because the axis of the rotary body deflects owing to insufficient rigidity.

These problems are thought attributable to the following reason. The magnetic field strength H and magnetic flux density B of the permanent magnet are in inverse proportion to the distance from the magnet and decrease with an increase in the distance. Suppose the distance between the superconductor and the permanent magnet is Z, the apparent magnetic susceptibility of the superconductor is M, the field strength of the permanent magnet is H and the flux density of the magnet is B. The force of magnetic repulsion between the superconductor and the permanent magnet is in proportion to the product of the susceptibility M and the gradient of field strength $dH/dZ$ or to the product of the susceptibility M and the gradient of flux density $dB/dZ$. The rigidity is proportional to the product of the susceptibility M and $d^2B/dZ^2$. However, the gradient of field strength $dH/dZ$ or the gradient of flux density $dB/dZ$ of the annular permanent magnet is not great sufficiently, hence insufficient rigidity and load capacity.

An object of the present invention is to overcome the foregoing problems and to provide a superconducting bearing device capable of supporting a rotary body in a noncontact state with good stability by preventing the deflection of the axis of the rotary body.

SUMMARY OF THE INVENTION

In a first embodiment, the present invention provides a super-conducting bearing device which comprises an annular permanent magnet portion disposed concentrically with a rotary body, and a superconductor opposed to an end face of the permanent magnet portion and spaced apart therefrom axially of the rotary body, the permanent magnet portion comprising a disk fixedly mounted on the rotary body, and a plurality of annular permanent magnets arranged on the disk at a spacing radially of the rotary body, each of the permanent magnets having axially opposite ends magnetized to polarities opposite to each other, the permanent magnets adjacent to each other being magnetized to polarities opposite to each other at their ends positioned toward the same axial direction.

Preferably, the spacing between the annular permanent magnets is 0.2 to 10 times the width of the magnets as measured radially thereof.

In a second embodiment, the present invention further provides a superconducting bearing device which comprises an annular permanent magnet portion disposed concentrically with a rotary body, and a superconductor opposed to the outer periphery of the permanent magnet portion and spaced apart therefrom radially of the rotary body, the permanent magnet portion comprising a disk of a nonmagnetic material fixedly mounted on the rotary body, and a plurality of annular permanent magnets embedded in the disk at a spacing axially of the rotary body, each of the permanent magnets having radially opposite sides magnetized to polarities opposite to each other, the permanent magnets adjacent to each other being magnetized to polarities opposite to each other at their same sides with respect to the radial direction.

Preferably, the spacing between the annular permanent magnets is 0.2 to 1.0 times the thickness of the magnets as measured axially thereof.

In the first embodiment, the permanent magnet portion comprises a disk fixedly mounted on the rotary body, and a plurality of annular permanent magnets arranged on the disk at a spacing radially of the rotary body, each of the permanent magnets having axially opposite ends magnetized to polarities opposite to each other, the permanent magnets adjacent to each other being magnetized to polarities opposite to each other at their ends positioned toward the same axial direction. Each of the permanent magnets is embedded in the disk and has an exposed end flush with an end face of the disk. In this case, a magnetic flux produced from the positive pole of one magnet and directed toward the negative pole of the same magnet upon reversion is added to a magnetic flux produced from the positive pole of another pole. This gives a strengthened magnetic flux and increases the gradient of flux density $dB/dZ$ and $d^2B/dZ^2$, consequently increasing the load capacity and the rigidity.

In the second embodiment, the permanent magnet portion comprises a disk fixedly mounted on the rotary body, and a plurality of annular permanent magnets arranged on the disk at a spacing axially of the rotary body, each of the permanent magnets having radially opposite sides magnetized to polarities opposite to each other, the permanent magnets adjacent to each other being magnetized to polarities opposite to each other at their same sides with respect to the radial direction. Each of the permanent magnets is embedded in the disk and has an exposed outer peripheral surface flush with the outer peripheral surface of the disk. In this case, a magnetic flux produced from the positive pole of one magnet and directed toward the negative pole of the same magnet upon reversion is added to a magnetic flux produced from the positive pole of another pole. This affords a strengthened magnetic flux and increases the gradient of flux density $dB/dZ$ and $d^2B/dZ^2$, consequently improving the load capacity and the rigidity.

In either case, therefore, the deflection of the axis of the rotary body can be prevented, enabling the device to support the rotary body in a noncontact state with good stability.

Experiments have shown that the reversion of the magnetic flux starts to become pronounced in a space at a distance of 0.3 times the magnet width from the magnetic pole in the axial direction and at least 0.2 times the width radially away therefrom. Accordingly when two magnets are arranged too closely, the magnetic flux produced from the positive pole of one of the magnets and the magnetic flux entering the negative pole of the other magnet will interfere with each other to produce an adverse effect.

Further with a single magnet, the space region where the flux density is great is limited to a distance corresponding to the width of the magnet from the center of the pole, so that the above effect of addition will disappear when the plurality of magnets are spaced apart by too large a distance.

With the magnetic portion comprising a plurality of annular permanent magnets in a concentric combination, the space region in which the gradient of flux density is great, for example, the region retaining 80% of the maximum value thereof, has an axial dimension corresponding to the width of the magnets. Further the radial dimension of the space region in which the gradient of magnetic flux is great is proportional to the spacing between the magnets, whereas the gradient of flux density decreases to a value nearly equal to that of the single magnet if the spacing between the magnet is not smaller than twice the width of the magnets. Since a great magnetic force is available when the superconductor is disposed in this space region of great flux density gradient, it is then possible to optimize the width of the magnets and the spacing therebetween in proportion to the clearance between the permanent magnet portion and the superconductor, whereby an increased load capacity and enhanced rigidity are obtained.

The superconducting bearing device embodying the present invention is suitable for use in hydraulic machines and machine tools which require high-speed rotation, power storage apparatus for storing excessive electric power as converted to kinetic energy of a flywheel, or gyroscopes.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
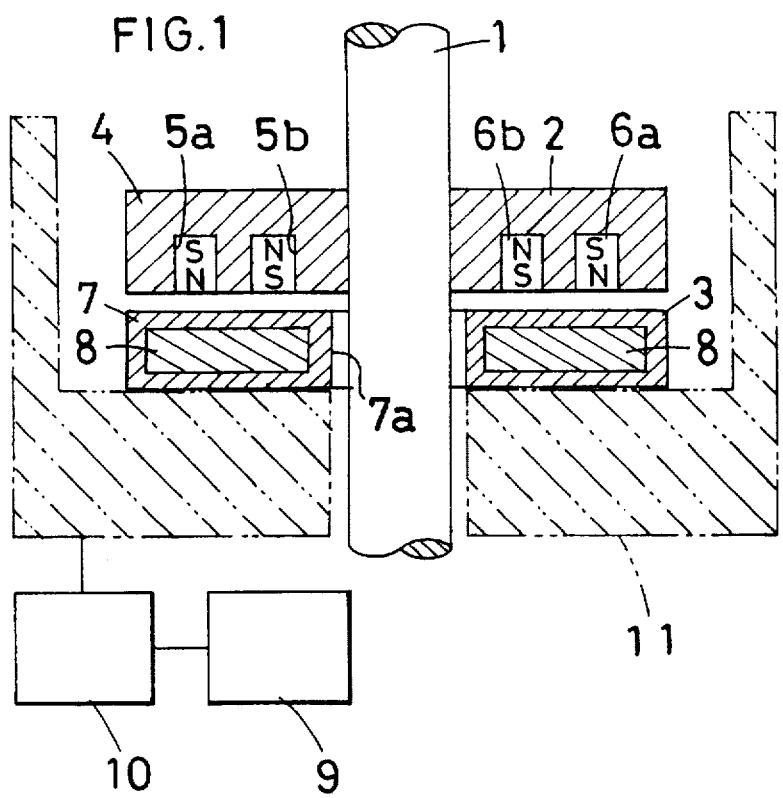
FIG. 1 is a diagram in vertical section showing the main portion of a superconducting bearing device in accordance with a first embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIG. 1 schematically shows the main potion of a first embodiment of a superconducting bearing device.

With reference to FIG. 1, the superconducting bearing device has a rotary body 1 in the form of a vertical shaft. A permanent magnet portion 2 in the form of a horizontal disk is mounted on the rotary body 1 concentrically therewith. An annular superconductor portion 3 is disposed as opposed to the lower end face of the permanent magnet portion 2 and spaced apart therefrom in the direction of axis of rotation of the rotary body 1.

The permanent magnet portion 2 comprises a horizontal disk 4 made of a non-magnetic material, for example, of copper, aluminum, or non-magnetic austenitic stainless steel, and fixedly mounted on the rotary body 1. The disk 4 is formed in its bottom surface with a plurality of, for example two, annular grooves 5a, 5b concentrically with the rotary body 1. Annular permanent magnets 6a, 6b are embedded in the grooves 5a, 5b, respectively. Each of permanent magnets 6a, 6b has an exposed end face flush with the bottom surface of the disk 4. The permanent magnets 6a, 6b used are those having a great energy product, such as samarium-cobalt magnets or neodymium-iron-boron magnets.

Each of the permanent magnets 6a, 6b has upper and lower ends which are magnetized to polarities opposite to each other. The upper ends of the adjacent magnets 6a, 6b, as well as the lower ends thereof, are magnetized to opposite polarities. For example, the outer magnet 6a has an S pole at the upper end and an N pole at the lower end, and the inner magnet 6b has an N pole at the upper end and an S pole at the lower end. The magnetic flux distribution around the axis of rotation is so designed as to remain unaltered by rotation. Assuming that the radial dimension of the permanent magnets 6a, 6b is the width thereof, the spacing between the magnets 6a, 6b is preferably 0.2 to 1.0 times the width.

The superconductor portion 3 comprises a horizontal disk 7 having a bore 7a and made, for example, of copper, and a plurality of disk-like type II superconductors 8 embedded in the annular portion of the disk 7 around its bore, arranged close to one another circumferentially of the disk and opposed to and spaced apart from the exposed ends of the permanent magnets 6a, 6b. All the disk-like superconductors 8 are equal in volume.

The superconductors 8 have an inside diameter smaller than the inside diameter of the innermost of the permanent magnets 6a, 6b and an outside diameter larger than the outside diameter of the outermost of the permanent magnets 6a, 6b.

The superconductors 8 comprise a substrate made of yttrium high-temperature superconducting material such as $YBa_2Cu_3O_x$ and incorporating normally conducting particles ($Y_2Ba_1Cu_1$) as uniformly mixed with the material, and have properties permitting the magnetic flux emitted by the permanent magnet portion 2 to effectively penetrate into the superconductors 8 and to be pinned thereto. The superconductors 8 are arranged at a position spaced apart from the permanent magnet portion 2 (that is, spaced apart from the bottom surface of disk 4 which is flush with the exposed ends of permanent magnets 6a, 6b) and permitting a specified quantity of magnetic flux of the magnet portion 2 to penetrate thereinto, the position being such that the penetrating flux distribution will not be altered by the rotation of the rotary body 1.

The superconducting bearing device has a 25 housing (not shown), which has fixedly provided therein a cooling case 11. This case 11 is cooled by a refrigerator 9 or the like by way of a temperature control unit 10, and has the superconductor portion 3 fixed thereto.

When the superconducting bearing device is operated, the superconductors 8 are cooled and maintained in a superconducting state with a refrigerant circulated through the cooling case 11. Accordingly, many of the magnetic fluxes emitted from the permanent magnet portion 2 on the rotary body 1 penetrate into the superconductors 8 and are thereby restrained (pinning phenomenon). With the particulate normal conductor uniformly present in the superconductors 8, the distribution of fluxes penetrating into the superconductors 8 is held constant, with the result that the rotary body 1 is arrested by the superconductors 8 along with the permanent magnet portion 2 as if the magnet portion 2 on the rotary body 1 is pierced with phantom pins extending upright from the superconductors 8. For this reason, the rotary body 1 is supported with respect to the radial and axial directions, as held levitated with high stability.

The magnetic fluxes of each of the adjacent permanent magnets 6a, 6b at the upper and lower ends of the magnet portion 2 are strengthened by those emitted by the other magnet and reversed to make the gradient of flux density $dB/dZ$ and $d^2B/dZ^2$ greater than when the permanent magnet portion comprises a single permanent magnet. This increases the force of magnetic repulsion between the magnet portion 2 and the superconductors 8. Moreover, a great force of magnetic attraction acts therebetween merely when the spacing between the magnet portion 2 and the superconductors 8 slightly increases toward the direction of axis of rotation from the distance at which the force of magnetic repulsion is in balance with the pinning force. Conversely, a great force of magnetic repulsion acts therebetween merely when the spacing slightly decreases from the distance of balance. Accordingly, a greater load capacity and improved rigidity are available.

A type I superconductor, i.e., a superconductor completely preventing the penetration of magnetic fluxes, may be used as the superconductor of the present embodiment. In this case, the rotary body is supported in a noncontact state with respect to the axial direction utilizing the complete diamagnetic phenomenon of the superconductor. It is desirable in this case to provide a superconducting bearing at a suitable position for supporting the rotary body with respect to the radial direction.

Specific Experimental Example

Experiments were conducted using the device of FIG. 1.

The disk 4 of the permanent magnet portion 2 used was one made of copper. The outer annular permanent magnet 6a used was an annular rare earth magnet which was 90 mm in outside diameter, 70 mm in inside diameter, 10 mm in width (radial dimension), 10 mm in thickness (axial dimension) and 4000 gauss in surface flux. The inner annular permanent magnet 6b used was an annular rare earth magnet which was 60 mm in outside diameter, 40 mm in inside diameter, 10 mm in width, 10 mm in thickness and 4000 gauss in surface magnetic flux. The two magnets 6a, 6b were used in a heteropolar combination which means that the upper ends thereof, as well as the lower ends thereof, had poles of opposite polarities. The superconductors 8 used were those measuring 35 mm in diameter and 12 mm in thickness. These superconductors were embedded in the disk 7 with the center of each positioned on the circumference of a circle with a diameter of 75 mm.

Figure 2:
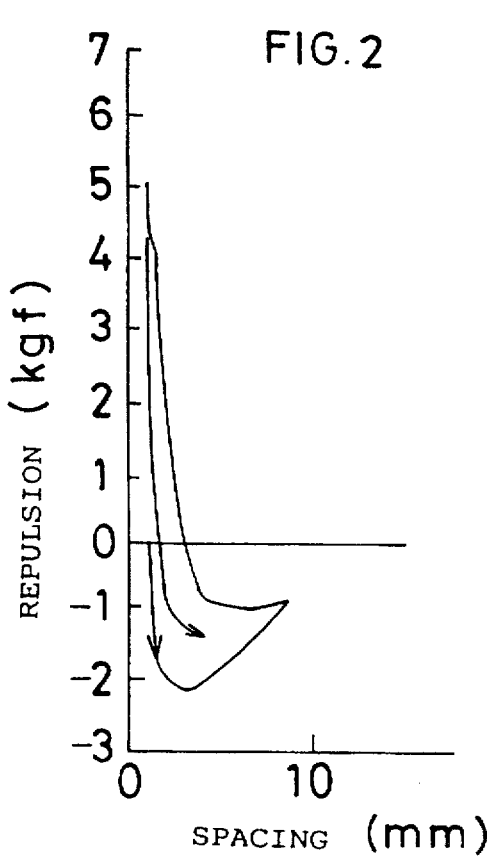
FIG. 2 is a graph showing the result of an experiment conducted with use of the device of the first embodiment.

The permanent magnet portion 2 and the superconductor portion 3 were positioned in place relative to each other, and the superconductors 8 were thereafter cooled and thereby maintained in a superconducting state. The distance Z between the permanent magnet portion 2 and the superconductor portion 3 was 3 mm at this time. Using a tensile compression tester, the permanent magnet portion 2 and the superconductor portion 3 were moved toward or away from each other to measure the loads required. FIG. 2 shows the result. When the distance Z was in the range of 2 to 4 mm, the rigidity was 3.9 kgf/mm.

Figure 3:
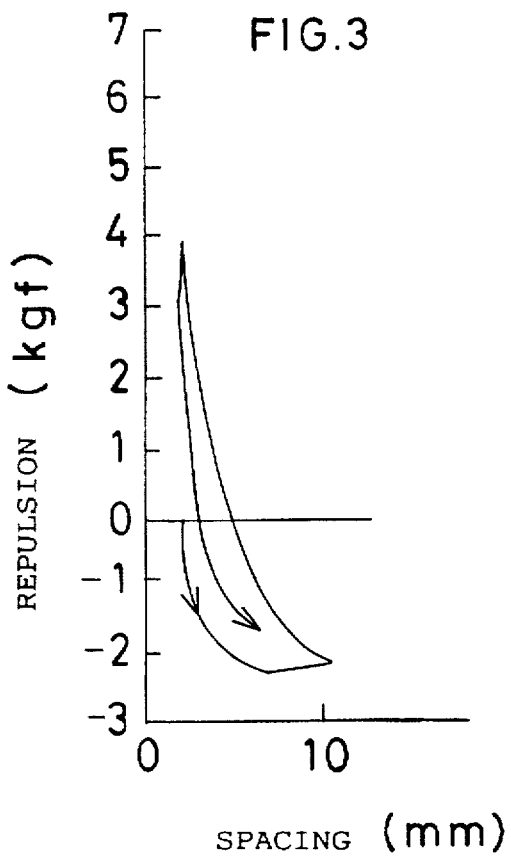
FIG. 3 is a graph showing the result of an experiment conducted for comparison.

For comparison, a permanent magnet portion comprising a single magnet, i.e., the outer magnet only, and the superconductor portion were moved toward or away from each other to measure the loads required. FIG. 3 shows the result. When the distance Z was in the range of 2 to 4 mm, the rigidity was 2.9 kgf/mm. Another experiment was also conducted in which the outer magnet and the inner magnet were used in a homopolar combination in which the corresponding ends thereof were made to have poles of the same polarity. Although not illustrated, the rigidity obtained in this case was 2.4 kgf/mm, and was lower than in the case of the single magnet.

To explore the optimum conditions for the arrangement of magnets, a superconductor portion with a diameter of 100 mm was prepared which was fully covered with superconductors, and magnets measuring 25 mm, 48 mm, 60 mm, 90 mm and 100 mm in outside diameter were used singly or in combinations as arranged on the same plane to measure the rigidity. Table 1 shows data as to the bearings. Table 2 shows the measurements of rigidity obtained.

TABLE 1

| Type | Magnet | Bearing O.D. (mm) | Net bearing area (cm$^2$) |
|---|---|---|---|
| Single magnet | 90 S | 90 | 50 |
|  | 60 S | 60 | 26 |
|  | 48 S | 48 | 30 |
|  | 25 S | 25 | 8 |
|  | 100 S | 100 | 62 |
| Heteropolar combination | 90 N + 60 S | 90 | 63 |
|  | 90 N + 48 S | 90 | 75 |
|  | 90 N + 25 S | 90 | 79 |
|  | 100 N + 60 S | 100 | 70 |
| Homopolar combination | 90 N + 60 N | 90 | 63 |

TABLE 2

| Bearing data | | Rigidity (kgf/mm) | | | Plane Rigidity (kgf/mm · cm$^2$) |
| --- | --- | --- | --- | --- | --- |
| Type | Magnet | Z = 2 mm | Z = 3 mm | Z = 6 mm | Z = 3 mm |
| Single magnet | 90 S |  | 2.9 (1.8) | 1.1 | 0.035 |
|  | 60 S |  | (0.65) |  | 0.023 |
|  | 48 S |  |  |  |  |
|  | 25 S |  | (0.38) |  | 0.035 |
|  | 100 S | 4.0 |  |  |  |
| Hetero-polar combination | 90 N + 60 S |  | 3.9 (2.7) | 1.5 | 0.043 |
|  | 90 N + 48 S |  | (2.4) |  | 0.032 |
|  | 90 N + 25 S |  | (2.2) |  | 0.028 |
|  | 100 N + 60 S | 8.0 |  |  |  |
| Homopolar combination | 90 N + 60 N |  | 2.4 | 0.9 | 0.024 |

Each numerical value given in the columns of magnet in these tables indicates the outside diameter of the magnet, and S or N following the value stands for the polarity of its lower end. The disk-like magnet with an outside diameter of 25 mm is 10 mm in thickness, the annular magnet with an outside diameter of 48 mm is 14 mm in width and 10 mm in thickness, the magnet with an outside diameter of 60 mm is 8 mm in width and 9 mm in thickness, the magnet with an outside diameter of 90 mm is 10 mm in width and 12 mm in thickness, and the magnet with an outside diameter of 100 mm is 10 mm in width and 10 mm in thickness. To expedite the experiment, the magnet or magnets were brought closer to the superconductors cooled in advance and moved upward and downward several times by 1 mm each time at Z=3 mm to measure the rigidity. Since the value of rigidity then obtained is somewhat different from the corresponding value obtained in the case where the parts are first set to Z=3 mm, followed by cooling, the measurement is given in the parentheses.

Figure 4:
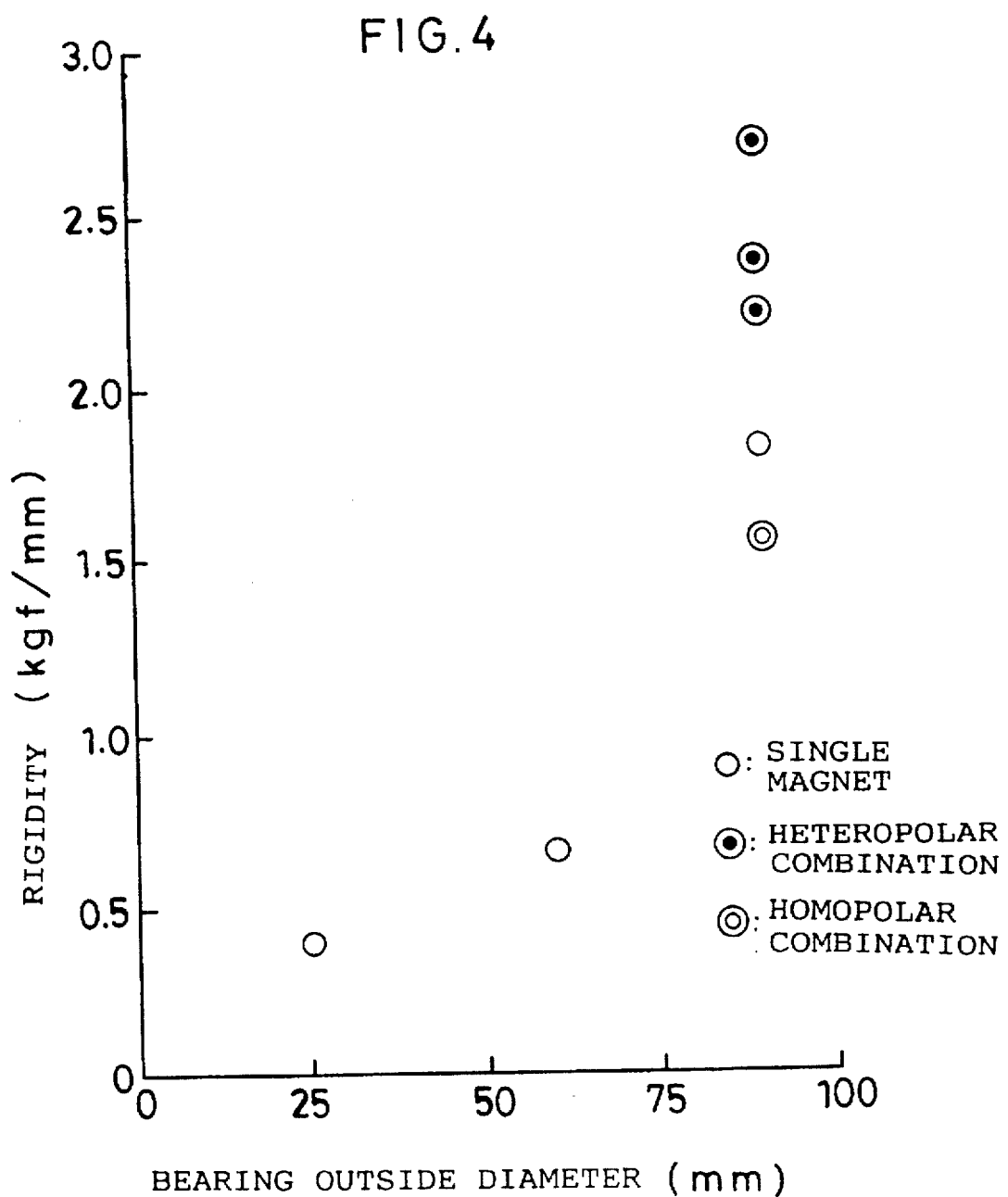
FIG. 4 is a graph showing the result obtained by checking the relationship between the diameter of bearings and the rigidity thereof.

Regarding the outside diameter of the outer magnet as the diameter of the bearing, the bearing rigidity values are typically shown in FIG. 4, in which the single magnet is represented by a blank circle mark, the heteropolar combination by a dot-and-circle mark, and the homopolar combination by a double circle mark. The graph shows that with the single magnets, the rigidity does not increase so greatly as to be proportional to the bearing area, hence the need for the heteropolar combination. However, the homopolar combination exhibits lower rigidity than the single magnet, hence an adverse effect.

Figure 5:
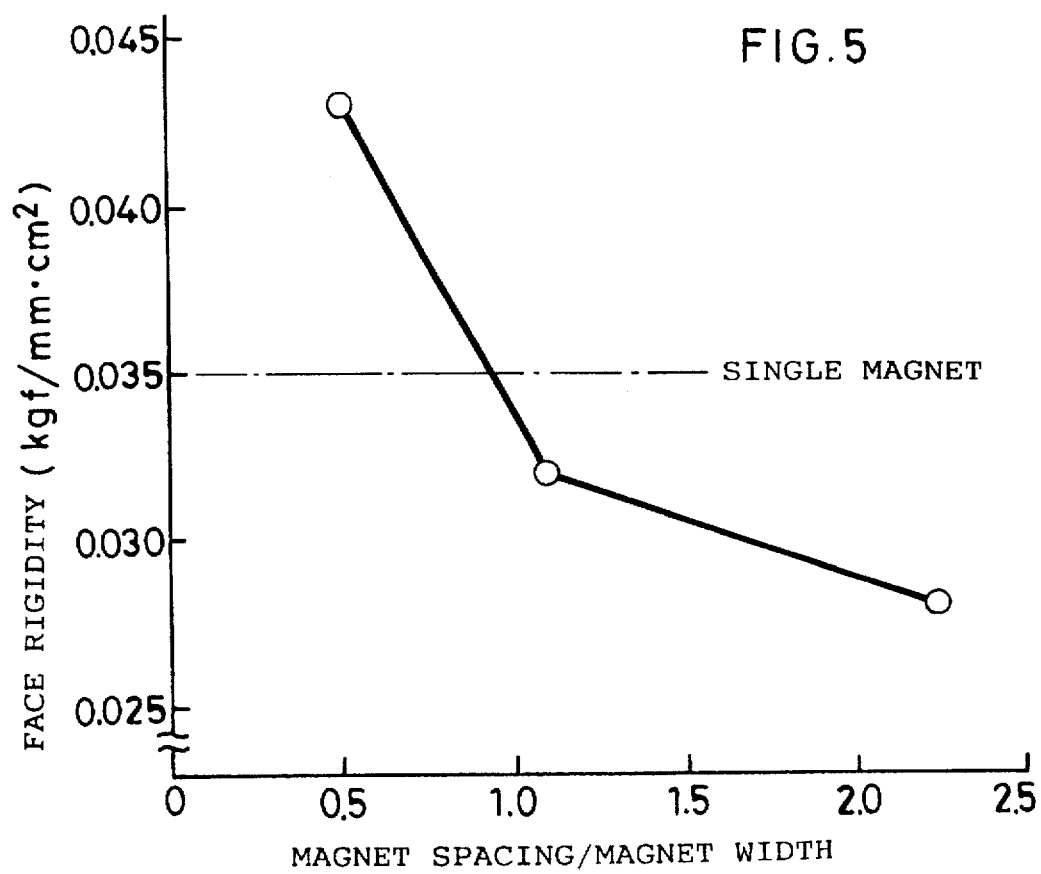
FIG. 5 is a graph showing the result obtained by checking the effect of the spacing between magnets on the same plane.

FIG. 5 shows the relationship between the plane rigidity (rigidity per unit area) and the spacing between the magnets as established for three different heteropolar combinations. When it is required that the plane rigidity in this case be manifestly above the plane rigidity of 0.035 in the case of the single magnet, the effective magnet spacing is in the range of 0.2 to 1.0 times the width. The lower limit was determined in view of the phenomenon that one of two magnets too closely arranged in heteropolar combination starts to offset the flux of the other magnet.

Figure 6:
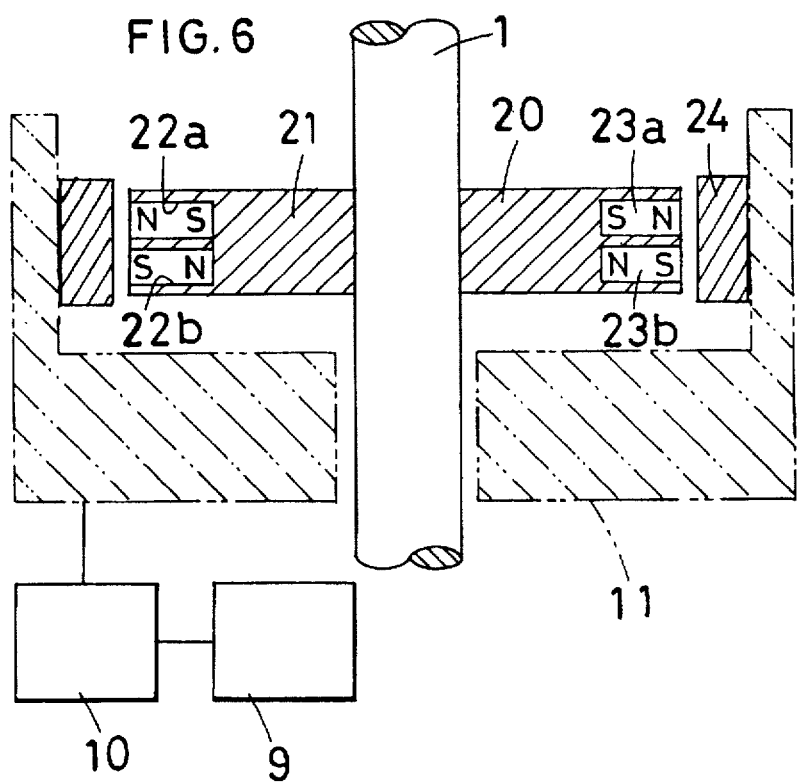
FIG. 6 is a diagram in vertical section showing the main portion of a superconducting bearing device in accordance with a second embodiment of the invention.

FIG. 6 schematically shows the main portion of a second embodiment of a superconducting bearing device.

In this case, a permanent magnet portion 20 has a disk 21 which, like disk 4, is made of a non-magnetic material such as copper, aluminum, or non-magnetic austenitic stainless steel. The disk 21 is formed in its outer periphery with a plurality of, for example two, annular grooves 22a, 22b vertically spaced apart. Annular permanent magnets 23a, 23b are fixedly fitted in the grooves 22a, 22b, respectively. Each of permanent magnets 23a, 23b has an exposed outer peripheral surface flush with the outer periphery of the disk 21.

Each of the permanent magnets 23a, 23b has radially opposite sides which are magnetized to polarities opposite to each other. The radially outer sides, as well as the inner sides, of the adjacent permanent magnets 23a, 23b are magnetized to opposite polarities. For example, the upper magnet 23a has an N pole at the outer periphery and an S pole at the inner periphery, and the lower magnet 23b has an S pole at the outer periphery and an N pole at the inner periphery. The magnetic flux distribution around the axis of rotation is so designed as to remain unaltered by rotation. Assuming that the axial dimension of the permanent magnets 23a, 23b is the thickness thereof, the spacing between the magnets 23a, 23b is preferably 0.2 to 1.0 times the thickness.

A type II superconductor 24 is disposed opposite to the outer periphery of the permanent magnet portion 20 and spaced apart therefrom radially of a rotary body 1. Incidentally, the superconductor 24 may be in the form of a complete ring or a segment of a ring. The superconductor 24 has an axial length larger than the distance from the upper end of the uppermost of the permanent magnets 23a, 23b to the lower end of the lowermost of the permanent magnets 23a, 23b. The superconductor 24 preferably is made of the same material as the superconductor 8, and has properties permitting the magnetic flux emitted by the permanent magnets 23a, 23b to effectively penetrate into the superconductor 8 and to be pinned thereto.

In this case, as described with reference to the first embodiment, the magnetic fluxes of each of the adjacent permanent magnets 23a, 23b at the outer peripheral part of the magnet portion 20 are strengthened by those emitted by the other magnet and reversed to make the gradient of flux density dB/dZ and d$^2$B/dZ$^2$ greater than when the permanent magnet portion comprises a single permanent magnet. This increases the force of magnetic repulsion between the magnet portion 20 and the superconductor 24. Moreover, a great force of magnetic attraction acts therebetween merely when the spacing between the magnet portion 20 and the superconductor 24 slightly increases toward the direction of axis of rotation from the distance at which the force of magnetic repulsion is in balance with the pinning force. Conversely, a great force of magnetic repulsion acts therebetween merely when the spacing slightly decreases from the distance of balance. Accordingly, a greater load capacity and improved rigidity are available.

A type I superconductor, i.e., a superconductor completely preventing the penetration of magnetic fluxes may be used as the superconductor also in this embodiment. In this case, the rotary body is supported in a noncontact state with respect to the radial direction utilizing the complete diamagnetic phenomenon of the superconductor. It is desirable in this case to provide a superconducting bearing at a suitable position for supporting the rotary body with respect to the axial direction.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A superconducting bearing device comprising:

a rotary body having an axis of rotation;

an annular permanent magnet portion disposed concentrically with the rotary body so as to have an axis of rotation coincident with that of the rotary body, the permanent magnet portion being configured to have a penetrating magnetic flux distribution does not vary when the rotary body is rotated, the permanent magnet portion comprising a disk of non-magnetic material fixedly mounted on the rotary body and having first and second end faces, and a plurality of annular permanent magnets arranged concentrically so as to provide innermost and outermost permanent magnets, the permanent magnets being embedded in the first face of the disk and being spaced radially from the rotary body and from each other, whereby the non-magnetic material of the disk is interposed between adjacent permanent magnets, each of the permanent magnets having an exposed first end face flush with the end face of the disk and a second end face embedded in the disk, each of the permanent magnets having axially opposite ends magnetized to polarities opposite to each other, the permanent magnets adjacent to each other being magnetized to polarities opposite to each other at their ends positioned toward the same axial direction; and a superconductor opposed to the first end face of the disk and spaced apart axially from the rotary body, the superconductor having an inside diameter smaller than the inside diameter of the innermost permanent magnet and an outside diameter larger than the outside diameter of the outermost permanent magnet, the superconductor having properties permitting the magnetic flux emitted by the permanent magnets to effectively penetrate into the superconductor and to be pinned thereto.

2. The superconducting bearing device of claim 1, wherein the permanent magnets are spaced from each other 0.2 to 1.0 times their width as measured radially.

3. The superconducting bearing device of claim 1, wherein the disk of the permanent magnet portion is made of a non-magnetic material selected from one of the following: copper, aluminum, and non-magnetic austenitic stainless steel.

4. A superconducting bearing device comprising:

a rotary body having an axis of rotation;

an annular permanent magnet portion disposed concentrically with the rotary body so as to have an axis of rotation coincident with that of the rotary body, the permanent magnet portion being configured to have a penetrating magnetic flux distribution which does not vary when the rotary body is rotated, the permanent magnet portion comprising a disk of non-magnetic material fixedly mounted on the rotary body and having first and second end faces and an outer peripheral surface, and a plurality of annular permanent magnets arranged co-axially so as to provide uppermost and lowermost permanent magnets, the permanent magnets being embedded in the outer peripheral surface of the disk and being spaced radially, from the rotary body and axially from each other, whereby the non-magnetic material of the disk is interposed between adjacent permanent magnets, each of the permanent magnets having upper and lower ends and an exposed outer peripheral surface flush with the outer peripheral surface of the disk, each of the permanent magnets having radially opposite sides magnetized to polarities opposite to each other, the permanent magnets adjacent to each other being magnetized to polarities opposite to each other at their same sides with respect to the radial direction; and a superconductor opposed to the outer peripheral surface of the disk and spaced apart radially from the rotary body and the outer peripheral surface of the disk, the superconductor having an axial length larger than the distance from the upper end of the uppermost permanent magnet to the lower end of the lowermost permanent magnet, the superconductor having an upper end positioned above the upper end of the uppermost permanent magnet and a lower end positioned below the lower end of the lowermost permanent magnet, the superconductor having properties permitting the magnetic flux emitted by the permanent magnets to effectively penetrate into the superconductor and to be pinned thereto.

5. The superconducting bearing device of claim 4, wherein the permanent magnets are spaced from each other 0.2 to 1.0 times their thickness as measured axially.

6. The superconducting bearing device of claim 4, wherein the disk of the permanent magnet portion is made of a non-magnetic material selected from one of the following: copper, aluminum, and non-magnetic austenitic stainless steel.

* * * * *